US012502741B2

(12) United States Patent
Hwang

(10) Patent No.: US 12,502,741 B2
(45) Date of Patent: Dec. 23, 2025

(54) UTILITIES SUPPLY APPARATUS FOR TOOL HOLDER OF MACHINE TOOL

(71) Applicant: DN SOLUTIONS CO., LTD, Changwon (KR)

(72) Inventor: Yonghyun Hwang, Changwon (KR)

(73) Assignee: DN SOLUTIONS CO., LTD., Changwon (KR)

(*) Notice: Subject to any disclaimer, the term of this patent is extended or adjusted under 35 U.S.C. 154(b) by 0 days.

(21) Appl. No.: 19/032,489

(22) Filed: Jan. 21, 2025

(65) Prior Publication Data

US 2025/0276386 A1    Sep. 4, 2025

(30) Foreign Application Priority Data

Mar. 4, 2024   (KR) ........................ 10-2024-0030424

(51) Int. Cl.
*B23B 29/24*   (2006.01)
*B23B 31/30*   (2006.01)
(Continued)

(52) U.S. Cl.
CPC .......... *B23Q 1/0018* (2013.01); *B23B 29/242* (2013.01); *B23B 31/302* (2013.01);
(Continued)

(58) Field of Classification Search
CPC ..... Y10T 29/5152–5167; Y10T 29/519; Y10T 82/2587; Y10T 408/37; Y10T 82/2506–2508; Y10T 409/303976–304032; Y10T 408/44–46; B23Q 2220/002; B23Q 2039/004; B23Q 2003/15586; B23Q 1/009–1/0036; B23Q 11/10–11/1092; B23B 29/24–29/34;
(Continued)

(56) References Cited

U.S. PATENT DOCUMENTS 2,940,473 A * 6/1960 Smith .................. B23Q 11/103
137/883
3,829,103 A * 8/1974 Sussman .............. B23Q 11/103
277/907
(Continued)

FOREIGN PATENT DOCUMENTS

JP         7720973 B1 *  8/2025
KR  10-2000-0015425 A     3/2000
(Continued)

*Primary Examiner* — Erica E Cadugan
(74) *Attorney, Agent, or Firm* — Harvest IP Law, LLP

(57) ABSTRACT

Utilities supplied through a first utility path of a turning tool holder via a docking device is supplied to a second utility path of an adjacent rotating tool holder through a communication arrangement, there is no need to provide a complex hydraulic line, a pneumatic line and a coupler for receiving the utilities from the docking device at a rearward side of the rotating tool holder. A rearward size of the rotating tool holder may be minimized, so that even when the rotating tool holder is mounted on the turret, no interference occurs with the docking device in the rearward direction when the turret rotates. As a result, it is possible to use the rotating tool holder, to which utilities supply is necessary, even in the turret which is provide with the docking device.

9 Claims, 10 Drawing Sheets

A state in which a turning tool holder and a docking cylinder device are connected.

(51) Int. Cl.
 *B23Q 1/00* (2006.01)
 *B23Q 5/04* (2006.01)
 *B23Q 11/10* (2006.01)
 *B23Q 11/00* (2006.01)
 *B23Q 17/00* (2006.01)

(52) U.S. Cl.
 CPC ......... *B23Q 1/0009* (2013.01); *B23Q 1/0036* (2013.01); *B23Q 11/1015* (2013.01); *B23B 2231/24* (2013.01); *B23B 2270/025* (2013.01); *B23B 2270/027* (2013.01); *B23B 2270/30* (2013.01); *B23C 2250/12* (2013.01); *B23C 2270/025* (2013.01); *B23C 2270/027* (2013.01); *B23Q 5/04* (2013.01); *B23Q 11/005* (2013.01); *B23Q 17/005* (2013.01); *B23Q 2220/002* (2013.01); *Y10T 29/5155* (2015.01)

(58) Field of Classification Search
 CPC ......... B23B 39/20–39/205; B23B 3/16–3/265; B23B 2270/025; B23B 2270/027; B23B 2250/12–2250/125; B23C 2250/12; B23C 2270/025; B23C 2270/027
 USPC .......... 29/35.5–48.5, 33 J; 82/159, 120–121, 82/900; 409/135–136; 408/35, 56–61
 See application file for complete search history.

(56) References Cited

U.S. PATENT DOCUMENTS

| | | | | |
|---|---|---|---|---|
| 5,190,421 | A | * | 3/1993 | Wen ........................ B23Q 11/10 408/56 |
| 5,265,505 | A | * | 11/1993 | Frechette ............. B23Q 1/0018 82/159 |
| 5,509,335 | A | * | 4/1996 | Emerson ............ B23Q 11/1053 82/900 |
| 10,150,193 | B2 | * | 12/2018 | Lai ........................ B23Q 1/0027 |
| 11,154,885 | B2 | * | 10/2021 | Nath ...................... B23B 29/242 |
| 2004/0237542 | A1 | * | 12/2004 | Zurecki ................ B23Q 1/0018 62/50.7 |
| 2012/0186053 | A1 | * | 7/2012 | Meidar .................. B23B 29/323 29/39 |
| 2020/0061766 | A1 | * | 2/2020 | Izumi ..................... B23Q 11/10 |
| 2020/0398346 | A1 | * | 12/2020 | Ju ........................ B23Q 1/0018 |
| 2022/0299969 | A1 | * | 9/2022 | Beck ..................... B23Q 1/0009 |

FOREIGN PATENT DOCUMENTS

| | | |
|---|---|---|
| KR | 10-2004-0059285 A | 7/2004 |
| KR | 10-2015-0025447 A | 3/2015 |
| KR | 10-2019-0083092 A | 7/2019 |

\* cited by examiner

[FIG. 1]
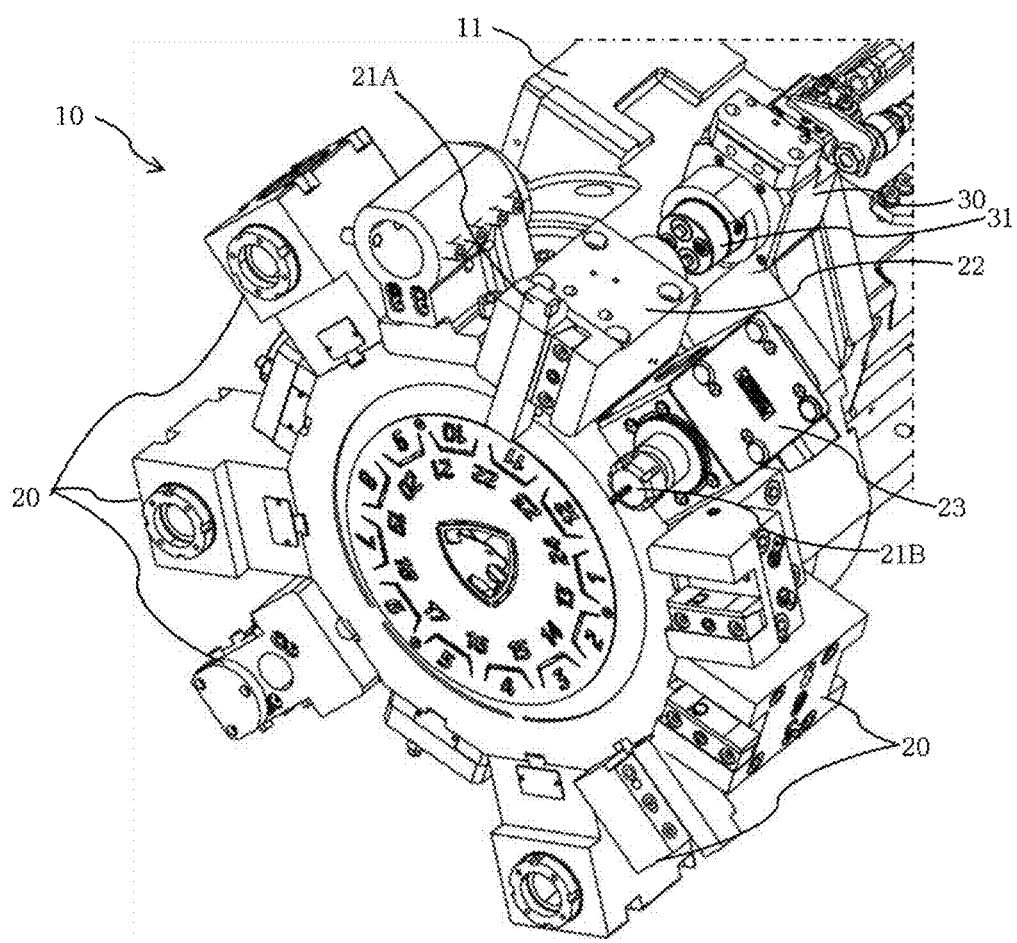

[FIG. 2]
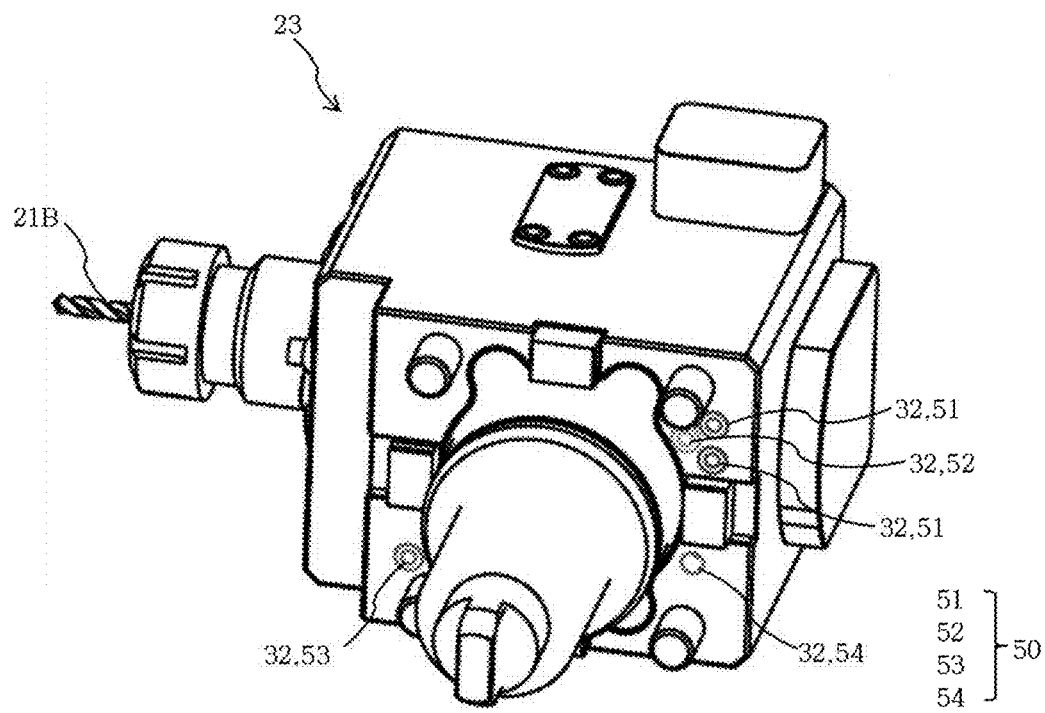
[FIG. 3]
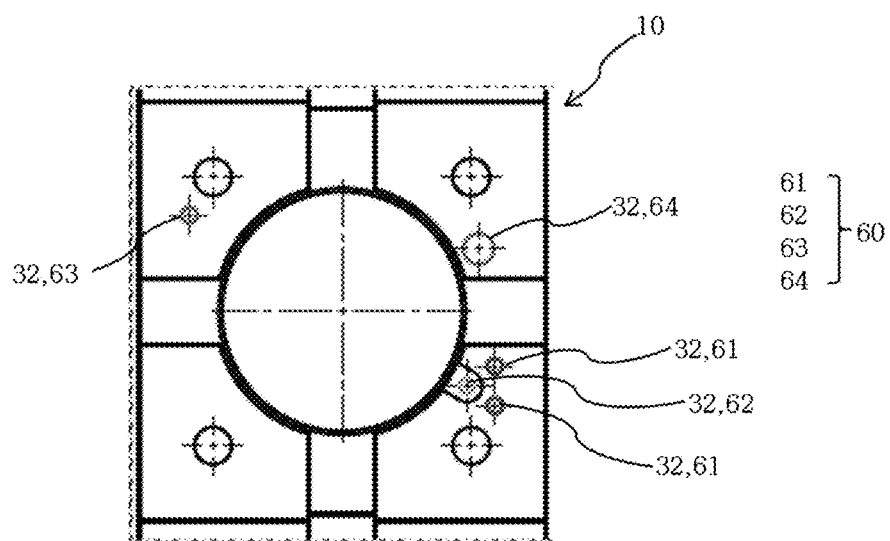

[FIG. 4]
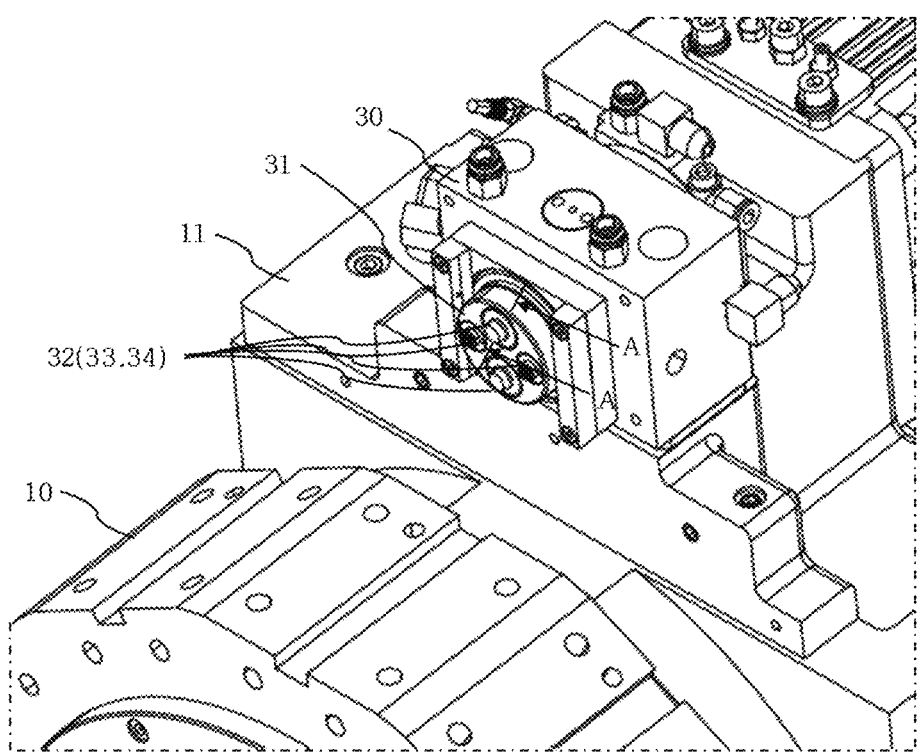

[FIG. 5]
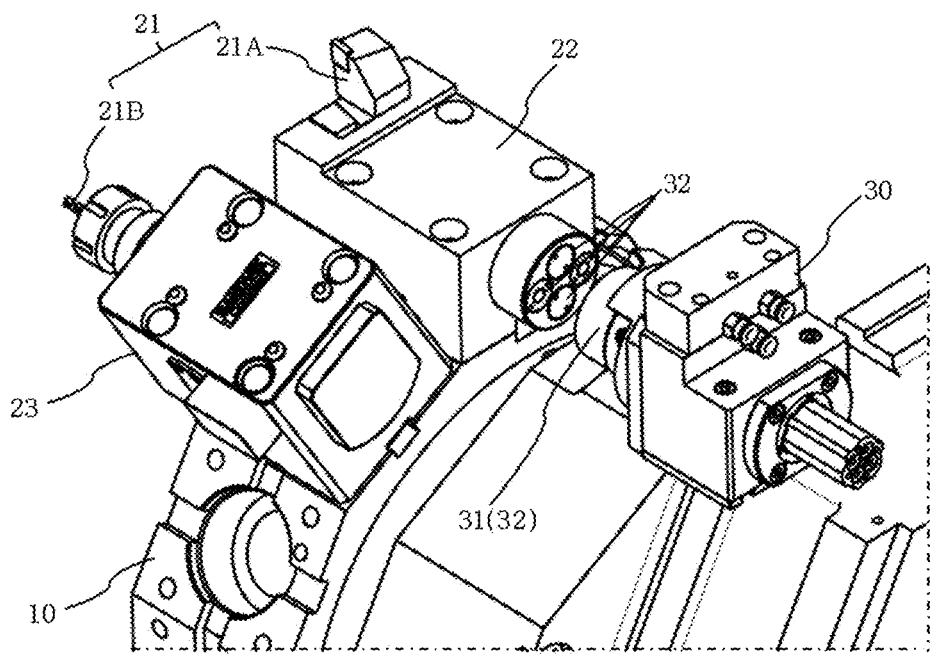

[FIG. 6]
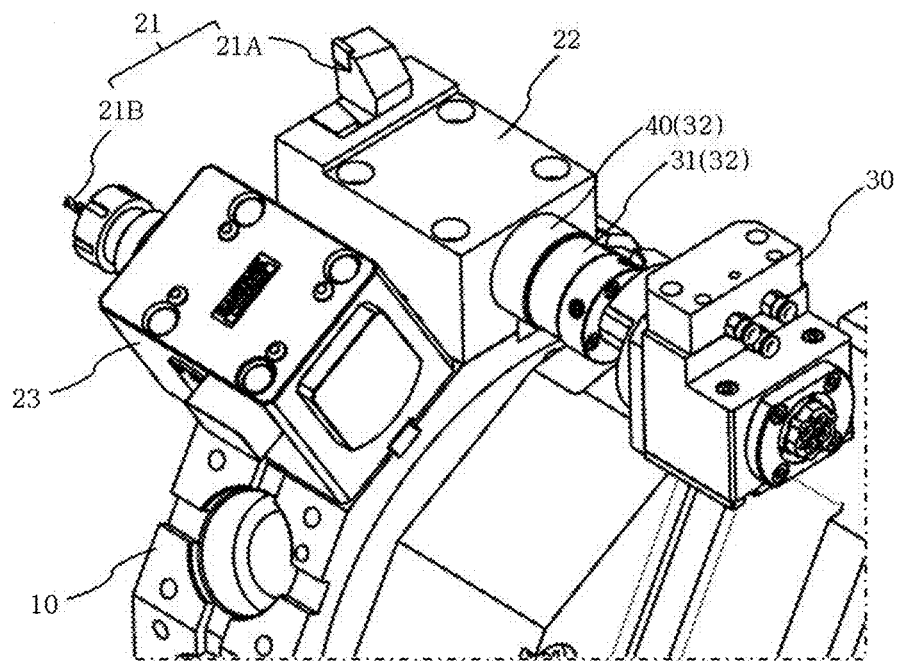
[FIG. 7]
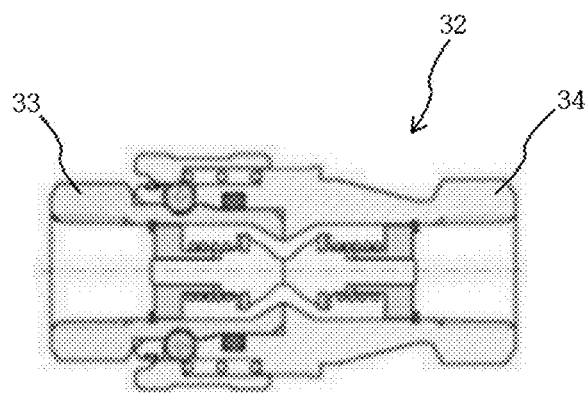

[FIG. 8]
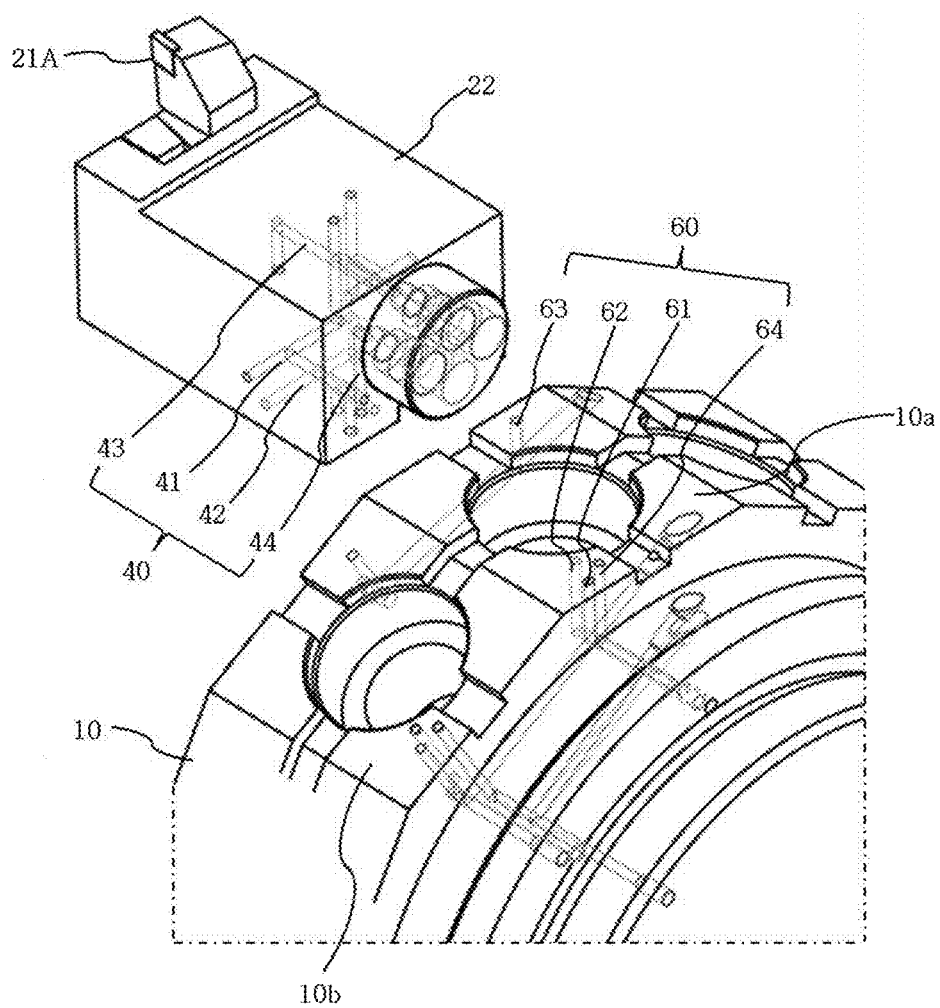

[FIG. 9]
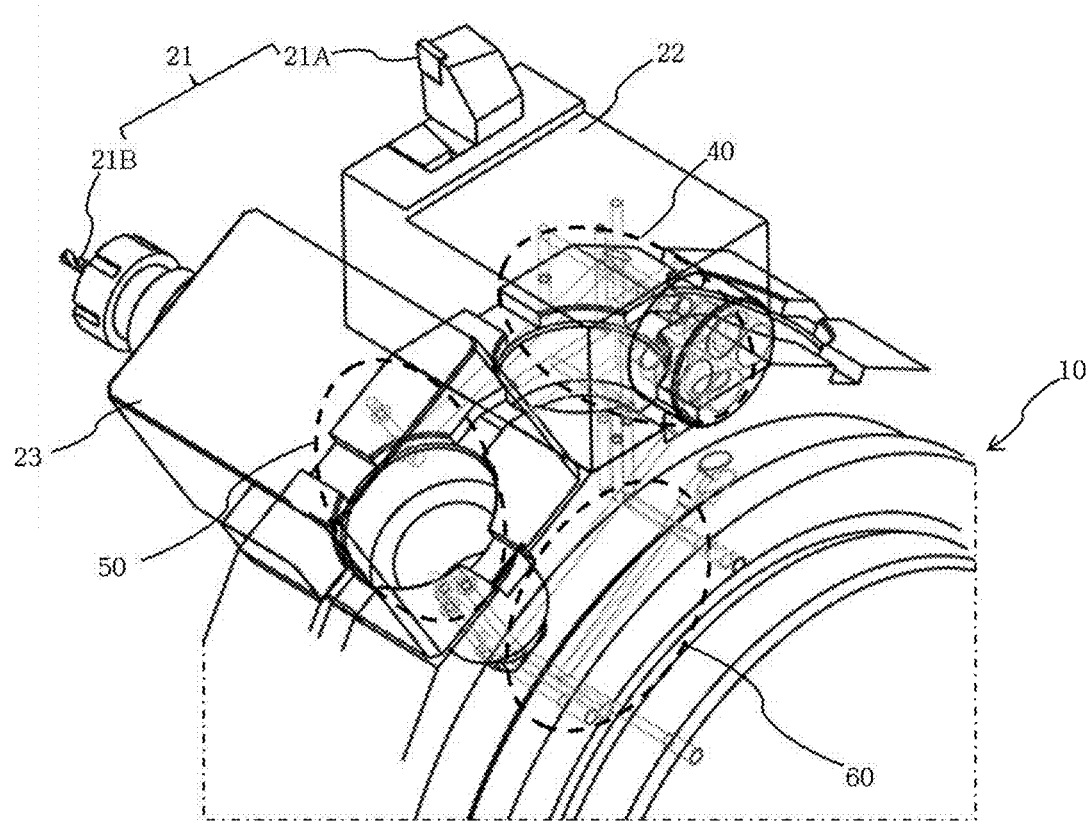

[FIG. 10A]
A state in which a rotating tool holder and a docking cylinder device are separated.
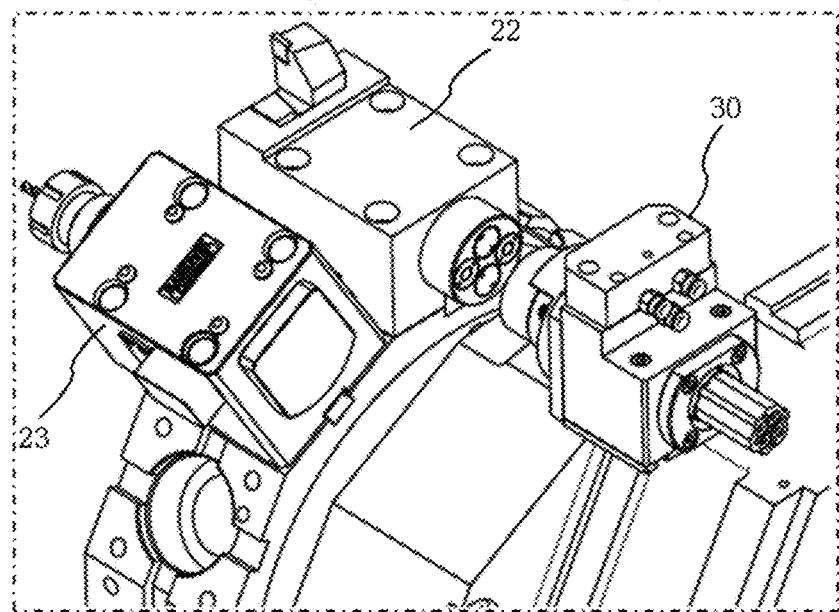

[FIG. 10B]
A state in which a turning tool holder and a docking cylinder device are connected.
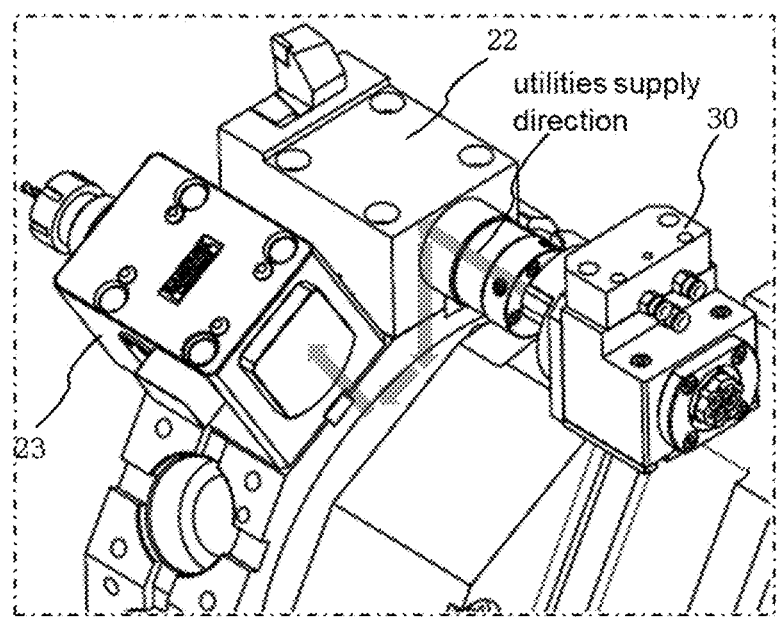

[FIG. 11]
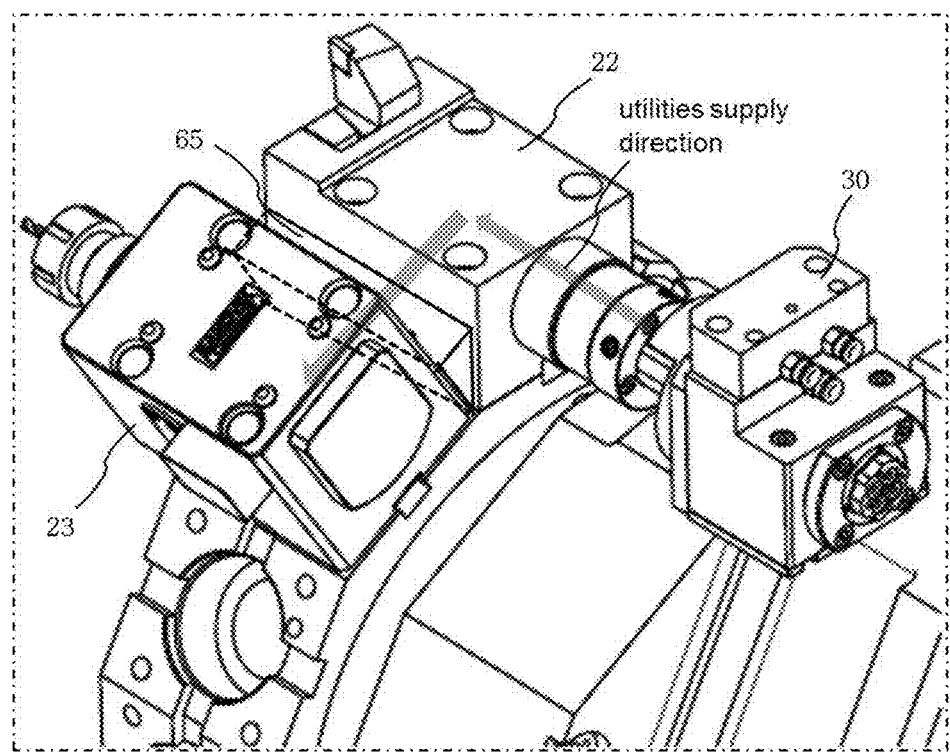

UTILITIES SUPPLY APPARATUS FOR TOOL HOLDER OF MACHINE TOOL

CROSS-REFERENCE(S) TO RELATED APPLICATIONS

The present application claims priority to Korean Patent Application No. 10-2024-0030424, filed on Mar. 4, 2024, the entire contents of which is incorporated herein for all purposes by this reference.

BACKGROUND

Field of the Disclosure

The present disclosure relates to an apparatus for supplying utilities including hydraulics and pneumatics to a tool holder provided in a turret of a machine tool, and more specifically, to a turret structure of a machine tool for supplying utilities including hydraulics and pneumatics to a tool holder.

Description of Related Art

In general, a machine tool such as a lathe may include a plurality of tool holders in a circumferential direction of a turret with a cylindrical structure, and the plurality of tool holders is provided on the turret in an angle-divisional manner. Various kinds of tools may be inserted and fixed into each tool holder according to a type of processing to a workpiece.

A tool to be inserted into one of the tool holders may be automatically exchanged by an automatic tool changer (ATC) among a plurality of tools stored in a tool magazine.

Meanwhile, the tool holder may include a clamp cylinder for clamping the tool to be inserted, a hydraulic line for supplying and discharging a hydraulic pressure to the clamp cylinder, a first pneumatic line for removing foreign substances disposed in a tool insertion portion, and a second pneumatic line for checking whether the tool is properly inserted in the tool insertion portion, in which these hydraulic and pneumatic lines may be communicated with other hydraulic and pneumatic lines provided at a rearward side of the tool holder, respectively.

Furthermore, a tool exchange position may be set on one side of a non-rotating turret body in a circumferential direction thereof, and a docking device may be installed to be connected with the hydraulic and pneumatic lines of the tool holder aligned at a tool exchange position.

When the tool holder with a tool to be exchanged is aligned at the tool exchange position, a docking cylinder of the docking device may move forward so that hydraulic and pneumatic lines of the docking device are connected to the hydraulic and pneumatic lines of the tool holder through a coupler, thereby supplying the hydraulic and pneumatic pressures to the tool holder.

Such hydraulic and pneumatic connection structures through the coupler may be available in a turret that only adopts a turning tool holder whose internal structure is relatively simple. However, in a case of a turret which adopts a rotating tool holder, e.g., for a milling tool, with a complex internal structure such as a bevel gear and a bearing for rotating a tool in addition to a tool clamping means inside the tool holder, and which uses the rotating tool to be exchanged by the ATC, it is impossible to provide complex hydraulic and pneumatic lines that may be connected to the docking device at the rear side of the tool holder as well as the coupler to connect the hydraulic and pneumatic lines to each other due to small internal space of the tool holder.

As a prior art, Patent Document 1 discloses a structure for driving a rotating tool in a turret. However, Patent Document 1 simply relates to a configuration to operate a rotating tool in a turret, which may not be applied to a rotating tool holder, like a present disclosure, having a complex internal structure for supplying utilities (or a utility) of hydraulic and pneumatic pressures or the like and for installing a tool clamping means, a bevel gear and a bearing inside a tool holder.

Patent Document 2 discloses a device for checking a clamping operation of a milling spindle, which includes a clamp or unclamp checking device by installing a pressure detection means for detecting a clamping pressure in a hydraulic line connected to a coupling hydraulic chamber when mounting a turning tool on the milling spindle equipped with a rotating tool. Patent Document 2 relates to a tool clamping device for a spindle, not a turret and is different from a structure of a rotating tool holder mounted on the turret in the present disclosure.

Patent Document 3 relates to an internal structure of a tool holder having an automatic clamp and unclamp type tool holder function that rotates a tool by a rotational power and automatically clamps and unclamps the tool, which may not be applied to a tool holder structure for supplying utilities of hydraulic and pneumatic pressures or the like as in the present disclosure.

Patent Document 4 discloses a turret of a machine tool including a driving unit providing a rotational power to the turret in which a plurality of tools is installed in a tool post body, a rotating unit coupled with an optional unit which is disposed at a portion of the turret and rotates in the same manner as the turret, and a fixing unit clamped or unclamped with the rotating unit to supply or block a pressure required to operate the optional unit. As mentioned above as a problem of the prior art, Patent Document 4 relates to a structure for a machine tool that adopts a turning tool holder having a relatively simple internal structure of the tool holder. Accordingly, Patent Document 4 may not be applied to a turret of a machine tool like a lathe that is equipped with an automatic tool change type configuration, since it has a small internal space for a rotating tool holder which has a complex internal structure for supplying utilities of hydraulic and pneumatic pressures or the like and for installing a tool clamping means, a bevel gear and a bearing inside the tool holder as well as a small external space at a rear side of the tool holder for providing hydraulic and pneumatic lines and the coupler that may be connected to the docking device.

SUMMARY

To resolve the problems discussed above, an object of the present disclosure is to provide an apparatus for supplying utilities including hydraulics and pneumatics to a tool holder provided in a turret of a machine tool which enables use of a rotating tool holder using the utilities such as hydraulics and pneumatics in a turret of the machine tool.

Another object of the present disclosure is invention is to provide an apparatus for supplying utilities including hydraulics and pneumatics to a tool holder provided in a turret of a machine tool which can minimize a rearward size of a rotating tool holder to supply hydraulics and pneumatics to the rotating tool holder as well as to an adjacent turning tool holder through an internal portion of a turret.

To achieve the objects discussed above, an apparatus for supplying utilities to a plurality of tool holders arranged in a circumferential direction of a turret of a machine may include: a docking unit coupled with a turret body and including a utility path capable of supplying at least one of utilities including a hydraulic pressure, a pneumatic pressure, and a coolant oil to a rear side of the tool holder, and an actuator for moving the utility path; at least one of a plurality of tool holders formed with a first utility path therein to receive utilities supplied from the docking device when the docking device is aligned at a predetermined rearward position; a rotating tool holder installed on the turret in a circumferential direction adjacent to the tool holder formed with the first utility path therein and formed with a second utility path formed therein to receive the utilities from the first utility path of the tool holder formed with the first utility path; and a communication means provided between the tool holder and the rotating tool holder and forming an internal connecting path to connect the first utility path and the second utility path.

In a preferred embodiment, the actuator of the docking unit may be a docking cylinder that moves the utility path in a forward or backward direction.

In a preferred embodiment, the tool holder formed with the first utility path therein may be a turning tool holder.

In a preferred embodiment, the first utility path may extend to an upper attachment surface of the turret on which the tool holder formed with the first utility path therein is installed, and the second utility path may extend to an upper attachment surface of the turret on which the rotating tool holder is installed.

In a preferred embodiment, the first utility path may include a first hydraulic line for supplying and discharging a hydraulic pressure, a first pneumatic line for spraying compressed air to a tool insertion portion, a first sensing line for spraying compressed air to check whether the tool is inserted properly, and a first coolant line for spraying a coolant oil to a forward direction of the turning tool holder.

In a preferred embodiment, the second utility path may include a second hydraulic line to communicate with the first hydraulic line of the first utility path, a second pneumatic line to communicate with the first pneumatic line of the first utility path, a second sensing line to communicate with the first sensing line of the first utility path, and a second coolant line to communicate with the first coolant line of the first utility path.

In a preferred embodiment, the communicating means may be a third utility path formed inside the turret to communicate the first utility path with the second utility path.

In a preferred embodiment, the third utility path may include a third hydraulic line to communicate the first hydraulic line of the first utility path with the second hydraulic line of the second utility path, a third pneumatic line to communicate the first pneumatic line of the first utility path with the second pneumatic line of the second utility path, a third sensing line to communicate the first sensing line of the first utility path with the second sensing line of the second utility path, and a third coolant line to communicate the first coolant line of the first utility path with the second coolant line of the second utility path.

In a preferred embodiment, the first utility path may extend in a direction of the adjacent rotating tool holder, and the second utility path may extend in a direction of the tool holder formed with the first utility path therein, a connecting block may be provided between the tool holder formed with the first utility path therein and the rotating tool holder as the communication means wherein the connecting block is formed with a connecting path to communicate the first utility path and the second utility path.

In a preferred embodiment, the tool holder formed with the first utility path therein and the rotating tool holder may be formed as one integrated body, the first utility path may extend in a direction of the rotating tool holder on a side, the second utility path may extend in a direction of the tool holder formed with the first utility path therein on a side, and the first utility path and the second utility path may be formed to communicate with each other.

In a preferred embodiment, the rotating tool holder may be a milling tool holder provided with a power transmission mechanism therein to transmit a rotational force.

In a preferred embodiment, a coupler is installed at a rear end portion of the tool holder formed with the first utility path and at a front end portion of the docking device to communicate or separate the utility path of the docking device and the first utility path of the tool holder.

The present disclosure may allow a worker to use a rotating tool holder which uses utilities such as hydraulics and pneumatics in a turret of a machine tool.

The present invention may minimize a rearward size of the rotating tool holder by supplying a hydraulic pressure and a pneumatic pressure to an adjacent tool holder formed with a first utility path therein and the rotating tool holder through an inside of the turret.

BRIEF DESCRIPTION OF THE DRAWINGS

FIG. 1 is a schematic perspective view illustrating a turret equipped with both a turning tool holder and a rotating tool holder according to an exemplary embodiment of the present disclosure.

FIG. 2 is a schematic perspective view illustrating a rotating tool holder according to an exemplary embodiment of the present disclosure.

FIG. 3 is a partial plan view illustrating an upper attachment surface of a turret on which a rotating tool holder is installed according to an exemplary embodiment of the present disclosure FIG. 4 is a partial perspective view illustrating a docking device installed at a turret according to an exemplary embodiment of the present disclosure.

FIG. 5 is a partial perspective view of a turret illustrating a state in which the docking device is separated from the turning tool holder according to an exemplary embodiment of the present disclosure.

FIG. 6 is a partial perspective view of a turret illustrating a state in which the docking device is connected to the turning tool holder according to an exemplary embodiment of the present disclosure.

FIG. 7 is a cross-sectional view of a coupler connecting utility lines of a turning tool holder and a docking device along a line A-A in FIG. 4 according to an exemplary embodiment of the present disclosure.

FIG. 8 is a schematic perspective view illustrating respective utility lines formed in the turning tool holder and a turret body according to an exemplary embodiment of the present disclosure.

FIG. 9 is a schematic perspective view illustrating respective utility lines communicating with a rotating tool holder through a turning tool holder and a turret body according to an exemplary embodiment of the present disclosure.

FIGS. 10A and 10B are operational state diagrams of supplying utilities to a rotating tool holder through a turning tool holder and a turret body according to an exemplary embodiment of the present disclosure.

FIG. 11 is an operational state diagram of supplying utilities from a turning tool holder to a rotating tool holder by installing a connecting block between the turning tool holder and the rotating tool holder according to an exemplary embodiment of the present disclosure.

DETAILED DESCRIPTION

The following description is merely exemplary in nature and is not intended to limit the present disclosure, application, or uses. It should be understood that throughout the drawings, corresponding reference numerals indicate like or corresponding units and features.

Hereinafter, preferred exemplary embodiments of the present disclosure are described in detail with reference to FIGS. 1 to 11.

Referring to FIGS. 1 to 6, a machine tool of the present disclosure may be provided with a plurality of tool holders 20 in an angle-divisional manner along a circumferential direction of a turret 10 having a cylindrical structure. Various kinds of tools may be inserted and fixed into respective tool holders 20. A tool 21 may be properly selected and used depending on a processing type of the workpiece. The tool 21 may include a turning tool 21A and a rotating tool 21B, and when there is no need to distinguish between them, a tool 21 will be used for simplicity hereinafter.

The plurality of tool holders 20 may be divided into a turning tool holder 22 on which a turning tool 21A is mounted and a rotating tool holder 23 on which a rotating tool 21B is mounted. The rotating tool holder 23 may be installed on the turret 10 adjacent to the turning tool holder 22 in the circumferential direction of the turret 10.

In the following exemplary embodiments, the turning tool holder 22 may not be necessarily a tool holder for installing the turning tool 21A, but may be a tool holder formed with a first utility path 40 therein, which is a tool holder for different processing purposes other than the rotating tool holder 23, or may be a tool holder-shaped block formed with a first utility path 40 therein (See FIG. 8).

In a preferred embodiment, the rotating tool holder 23 may be inserted at a distal end portion with the rotating tool 21B such as a milling tool, a tap or a drill, and may have a power transmission mechanism such as a gear device, a bearing, or the like to rotate the rotating tool 21B. In a preferred embodiment, the rotating tool holder 23 may include a milling tool holder.

Meantime, a tool magazine (not shown) equipped with a plurality of tools 21 may be disposed at a position adjacent to the turret 10, and an automatic tool changer for exchanging the tool 21 between the tool magazine and the tool holder 20. In accordance with kinds of a work to process the workpiece, an automatic tool changing operation may be performed in which the tool 21 stored in the tool magazine may be inserted into the turning tool holder 22 or the rotating tool holder 23, and the tool 21 inserted into the turning tool holder 22 or the rotating tool holder 23 may be removed therefrom and stored in the tool magazine.

In addition, a docking device 30 may be provided at one side of a turret body 11 in the circumferential direction of the turret 10 in which the docking device 30 includes a utility path therein that faces a rearward side of the tool holder 20 and supplies a utility (or utilities) including a hydraulic pressure, a pneumatic pressure, and a coolant oil to the rearward side of the tool holder 20, and an actuator that moves the utility path to be connected to the rearward side of the tool holder 20.

Preferably, the actuator may be a docking cylinder 31 that moves the utility path forward and backward to be connected to the rearward side of the tool holder 20.

Inside the turning tool holder 22, a first utility path 40 extending in a rearward direction of the turning tool holder 22 may be provided to receive the utilities such as a hydraulic pressure, a pneumatic pressure, a coolant oil or the like which are supplied from the utility path of the docking device 30.

As shown in FIG. 8, the first utility path 40 may include a first hydraulic line 41 for supplying a hydraulic pressure to and discharging the hydraulic pressure from a clamp cylinder (not shown) that clamps the tool 21 inserted in the turning tool holder 22, a first pneumatic line 42 for spraying compressed air to a tool insertion portion to remove foreign substances like chips when inserting the tool 21 into tool insertion portion, a first sensing line 43 for spraying compressed air to check whether the tool 21 is properly inserted by means of detecting a pressure, and a first coolant line 44 for spraying the coolant oil to a processing region in front of the turning tool holder 22.

Meanwhile, in another exemplary embodiment, the first utility path 40 may be configured by omitting one or more of the first hydraulic line 41, the first pneumatic line 42, the first sensing line 43, and the first coolant oil line 44 depending on the type and function of the tool 21 being inserted into the turning tool holder 22.

A plurality of couplers 32 may be provided at a rear end portion of the first utility path 40 that includes the first hydraulic line 41, the first pneumatic line 42, the first sensing line 43 and the first coolant oil line 44 of the turning tool holder 22 and a front end portion of the docking device 30 installed correspondingly to the turning tool holder 22, respectively, in which the respective couplers 32 are configured to be communicated with each other when connected to the first hydraulic line 41, the first pneumatic line 42, the first sensing line 43 and the first coolant oil line 44 of the first utility path 40 and are configured to be blocked to each other when disconnected with those lines 41, 42, 43 and 44 first utility path 40.

Meanwhile, referring to FIG. 7, each coupler 32 may include a plug 33 and a socket 34 that connects or blocks a flow of the utilities such as a hydraulic pressure, a pneumatic pressure, and a coolant oil. The plug 33 and the socket 34 may be separately installed at a front end portion of the first utility path 40 in a rearward direction of the turning tool holder 22 and at a front end portion of a utility path of the docking device 30, respectively, so that when the turning tool holder 22 is aligned at a front position of the docking device 30, the docking cylinder 31 of the docking device 30 may move forward to connect the plug 33 and the socket 34, thereby supplying the utilities from the docking device 30 to the first utility path 40 of the turning tool holder 22.

Each coupler 32 may be formed in a liquid-tight structure including an O-ring to prevent the hydraulic pressure, the pneumatic pressure, or the coolant oil from leaking when the plug 33 and the socket 34 are connected to or separated from each other.

In another exemplary embodiment, there is no need that the coupler 32 is necessarily composed of the plug 33 and the socket 34, the coupler 32 may be configured in any other liquid-tight structures which can prevent a leakage of the utilities like a hydraulic pressure, a pneumatic pressure, or a coolant oil when the plug 33 and the socket 34 are connected to or separated from each other.

Referring to FIGS. 8 and 9, the first utility path 40 including the first hydraulic line 41, the first pneumatic line 42, the first sensing line 43 and the first coolant oil line 44 may extend to an upper attachment surface 10a and 10b of the turret 10 on which the turning tool holder 22 and the rotating tool holder 23 are installed, respectively.

Preferably, the first hydraulic line 41, the first pneumatic line 42, the first sensing line 43 and the first coolant oil line 44 of the first utility path 40 that extend to the upper attachment surface 10a of the turret 10 may extend to a lower portion of the turning tool holder 22 and then may communicably extend to an upper portion of the upper attachment surface 10a of the turning tool holder 22 on the turret 10.

The second utility path 50 including the second hydraulic line 51, the second pneumatic line 52, the second sensing line 53 and the second coolant oil line 54, each of which corresponds to the first hydraulic line 41, the first pneumatic line 42, the first sensing line 43 and the first coolant oil line 44 of the first utility path 40, may be configured inside the rotating tool holder 23. An inlet of the second utility path 50 may extend to an upper attachment surface 10b of the rotating tool holder 23 on which the rotating tool holder 23 is installed.

Meanwhile, the turning tool holder 22 and the rotating tool holder 23 may be installed in a pressurized contact with the upper attachment surfaces 10a and 10b of the turret 10, respectively, by a pressurizing fastening means such as bolts, so that it is possible to more securely prevent a leakage of the utilities such as a hydraulic pressure, a pneumatic pressure or a coolant oil, etc.

Inside the turret 10 where the turning tool holder 22 and the rotating tool holder 23 are adjacently installed, a third utility path 60 may be formed as a communicating means which forms an internal connecting path to communicate the first utility path 40 of the turning tool holder 22 and the second utility path 50 of the rotating tool holder 23. In other words, the third utility path 60 may include a third hydraulic line 61, a third pneumatic line 62, a third sensing line 63, and a third coolant oil line 64 that correspondingly communicate the first hydraulic line 41, the first pneumatic line 42, the first sensing line 43, and the first coolant oil line 44 of the first utility path 40 with the second hydraulic line 51, the second pneumatic line 52, the second sensing line 53, and the second coolant oil line 54 of the second utility path 50.

An O-ring (not shown) may be provided to prevent a leakage of the utilities such as a hydraulic pressure, a pneumatic pressure or a coolant oil at a connecting portion between the first hydraulic line 41, the first pneumatic line 42, the first sensing line 43, and the first coolant oil line 44 of the first utility path 40 of the turning tool holder 22, which are connected with the third hydraulic line 61, the third pneumatic line 62, the third sensing line 63 and the third coolant oil line 64 of the third utility path 60, and the second hydraulic line 51, the second pneumatic line 52, the second sensing line 53, and the second coolant oil line 54 of the second utility path 50.

In another exemplary embodiment, the turret 10 may be equipped with a plurality of pairs of the turning tool holder 22 and the rotating tool holder 23 each including a pair of turning tool holder 22 and rotating tool holder 23 as described above. Inside the turret 10 having the turning tool holder 22 and the rotating tool holder 23, as a communicating means, there may be provided with the third utility path 60 including the third hydraulic line 61, the third pneumatic line 62, the third sensing line 63, and the third coolant oil line 64. Accordingly, the first hydraulic line 41, the first pneumatic line 42, the first sensing line 43 and the first coolant oil line 44 which constitute the first utility path 40 of the turning tool holder 22 may be communicated with the second hydraulic line 51, the second pneumatic line 52, the second sensing line 53, and the second coolant oil line 54 which constitute the second utility path 50 of the rotating too holder 23, respectively, such that the rotating tool holder 23 may be installed further in plural in the turret 10.

Referring to FIGS. 10A and 10B, operational processes of the present disclosure configured as in the above embodiments will be explained hereinafter.

When the turning tool holder 22 installed adjacent to the rotating tool holder 23 reaches a position aligned with the docking device 30, the docking cylinder 31 may move forward such that one side of the coupler 32, which forms a front end of the utility path for supplying the hydraulic pressure, the pneumatic pressure, and the coolant oil, may be connected with the other side of the coupler 32 installed at a rear end of the turning tool holder 22. Therefore, the utilities supplied to the docking device 30 may be delivered to the first utility path 40 of the turning tool holder 22, and then the utilities including the hydraulic pressure, the pneumatic pressure, and the coolant oil supplied to the turning tool holder 22 may be supplied to the second utility path 50 of the adjacent rotating tool holder 23 through the third utility path 60 acting as a communication means provided inside the turret 10.

The utilities supplied to the rotating tool holder 23 may clamp the tool 21 of the rotating tool holder 23 to be rotatable using the hydraulic pressure, remove foreign substances from the insertion portion of the tool 21 using the pneumatic pressure, simultaneously detect whether the tool 21 is properly installed in the insertion portion, and spray the coolant oil to the processing region in front of the tool 21.

In further exemplary embodiment, as shown in FIG. 11, the first hydraulic line 41, the first pneumatic line 42, the first sensing line 43, and the first coolant oil line 44 constituting the first utility path 40 formed inside the turning tool holder 22 may extend in a direction toward the adjacent rotating tool holder 23, and the second hydraulic line 51, the second pneumatic line 52, the second sensing line 53, and the second coolant oil line 54 constituting the second utility path 50 of the rotating tool holder 23 may extend in a direction toward the turning tool holder 22. A communication means, which communicates the first utility path 40 of the turning tool holder 22 and the second utility path 50 of the rotating tool holder 23, may be provided between the turning tool holder 22 and the adjacent rotating tool holder 23.

The communication means may be in closely contact with both the turning tool holder 22 and the rotating tool holder 23 by means of a fastening means (not shown) in which a connecting block 65 formed with a connecting path therein is provided, such that the utilities supplied to the first utility path 40 of the turning tool holder 22 through the docking device 30 may be supplied to the adjacent second utility path 50 of the rotating tool holder 23.

Meantime, in still further exemplary embodiment, the turning tool holder 22 and the rotating tool holder 23 may be formed as one integrated body. As a communication means for communicating the first utility path 40 of the turning tool holder 22 and the second utility path 50 of the rotating tool holder 23, the first hydraulic line 41, the first pneumatic line 42, the first sensing line 43, and the first coolant oil line 44 constituting the first utility path 40 formed inside the turning tool holder 22 may extend in a direction toward the adjacent rotating tool holder 23, and the second hydraulic line 51, the second pneumatic line 52, the second sensing line 53, and the second coolant oil line 54 constituting the second utility path 50 of the rotating tool holder 23 may extend in a direction toward the turning tool holder 22.

According to such configurations in the above, the first utility path 40 of the turning tool holder 22 and the second utility path 50 of the rotating tool holder 23 may be communicated with each other, so that the utilities such as the hydraulic pressure, the pneumatic pressure, and the coolant oil being supplied to the turning tool holder 22 through the docking device 30 may be also supplied to the adjacent rotating tool holder 23, which is formed as one integrated body with the turning tool holder 22.

Here, the communication means may be an extended portion to communicate the first hydraulic line 41, the first pneumatic line 42, the first sensing line 43, and the first coolant oil line 44 of the turning tool holder 22 with the second hydraulic line 51, the second pneumatic line 52, the second sensing line 53, and the second coolant oil line 54 of the rotating tool holder 23.

As described in the exemplary embodiments in the above, the utilities supplied through the first utility path 40 of the turning tool holder 22 via the docking device 30 may be supplied to the second utility path 50 of the adjacent rotating tool holder 23 through the communication means, so there is no need to provide a complex hydraulic line, a pneumatic line and a coupler for receiving the utilities from the docking device 30 at a rearward side of the rotating tool holder 23.

Therefore, a rearward size of the rotating tool holder 23 may be minimized, so that even when the rotating tool holder 23 is mounted on the turret 10, no interference occurs with the docking device 30 in the rearward direction when the turret 10 rotates.

As a result, it is possible to use the rotating tool holder 23, to which a utilities supply is necessary, even in the turret 10 which is provided with the docking device 30.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for supplying utilities to a plurality of tool holders arranged in a circumferential direction of a turret of a machine tool, comprising:
    a docking device coupled with a turret body and including a docking device utility path capable of supplying at least one of utilities including a hydraulic pressure, a pneumatic pressure, and a coolant oil to a rear side of a first one of the tool holders, and the docking device further comprising an actuator for moving the docking device utility path;
    at least the first one of the plurality of tool holders being formed with a first utility path therein to receive the utilities supplied from the docking device when the docking device is aligned at a predetermined rearward position with the first one of the tool holders;
    a rotating tool holder of the plurality of tool holders, the rotating tool holder being installed on the turret in a circumferential direction adjacent to the first tool holder that is formed with the first utility path therein, the rotating tool holder being formed with a second utility path formed therein to receive the utilities from the first utility path of the first tool holder; and
    a communication means provided between the first tool holder and the rotating tool holder and forming an internal connecting path to connect the first utility path and the second utility path.

2. The apparatus of claim 1, wherein the actuator of the docking device is a docking cylinder that moves the docking device utility path in a forward or backward direction.

3. The apparatus of claim 1, wherein the first tool holder formed with the first utility path therein is a turning tool holder.

4. The apparatus of claim 1, wherein the first utility path extends to an upper attachment surface of the turret on which the first tool holder formed with the first utility path therein is installed, and the second utility path extends to an upper attachment surface of the turret on which the rotating tool holder is installed.

5. The apparatus of claim 1, wherein the first utility path includes a first hydraulic line for supplying and discharging a hydraulic pressure, a first pneumatic line for spraying compressed air to a tool insertion portion for receiving a tool, a first sensing line for spraying compressed air to check whether the tool is inserted properly, and a first coolant line for spraying a coolant oil from the first tool holder in a forward direction.

6. The apparatus of claim 5, wherein the second utility path includes a second hydraulic line to communicate with the first hydraulic line of the first utility path, a second pneumatic line to communicate with the first pneumatic line of the first utility path, a second sensing line to communicate with the first sensing line of the first utility path, and a second coolant line to communicate with the first coolant line of the first utility path.

7. The apparatus of claim 6, wherein the communicating means is a third utility path formed inside the turret to communicate the first utility path with the second utility path, and wherein the third utility path includes:
    a third hydraulic line to communicate the first hydraulic line of the first utility path with the second hydraulic line of the second utility path,
    a third pneumatic line to communicate the first pneumatic line of the first utility path with the second pneumatic line of the second utility path,
    a third sensing line to communicate the first sensing line of the first utility path with the second sensing line of the second utility path, and
    a third coolant line to communicate the first coolant line of the first utility path with the second coolant line of the second utility path.

8. The apparatus of claim 1, wherein the communicating means is a third utility path formed inside the turret to communicate the first utility path with the second utility path.

9. The apparatus of claim 1, wherein a coupler is installed at a rear end portion of the first tool holder formed with the first utility path and at a front end portion of the docking device to communicate or separate the docking device utility path and the first utility path of the first tool holder.

* * * * *